(12) United States Patent
Raz

(10) Patent No.: US 12,449,953 B2
(45) Date of Patent: Oct. 21, 2025

(54) MONITORING SYSTEM WITH DYNAMIC USER MENU FEATURES

(71) Applicant: GENTEX CORPORATION, Zeeland, MI (US)

(72) Inventor: Guy Raz, Binyamina (IL)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 18/164,865

(22) Filed: Feb. 6, 2023

(65) Prior Publication Data

US 2024/0264717 A1    Aug. 8, 2024

(51) Int. Cl.
G06F 3/048    (2013.01)
G06F 3/0482    (2013.01)
G06V 20/59    (2022.01)
G06V 20/64    (2022.01)

(52) U.S. Cl.
CPC .......... *G06F 3/0482* (2013.01); *G06V 20/593* (2022.01); *G06V 20/597* (2022.01); *G06V 20/64* (2022.01)

(58) Field of Classification Search
None
See application file for complete search history.

(56) References Cited

U.S. PATENT DOCUMENTS

| | | | |
|---|---|---|---|
| 2006/0208169 A1* | 9/2006 | Breed | G01S 17/88 |
| | | | 250/221 |
| 2016/0023665 A1* | 1/2016 | Sherony | B60Q 1/507 |
| | | | 701/2 |
| 2016/0082839 A1* | 3/2016 | Ricci | G06Q 20/321 |
| | | | 701/36 |
| 2017/0174229 A1* | 6/2017 | Mueller | B60W 40/08 |
| 2019/0073040 A1* | 3/2019 | Luchner | G06F 3/0482 |
| 2021/0070145 A1* | 3/2021 | Nitze-Nelson | B60H 1/0065 |
| 2021/0237577 A1* | 8/2021 | Stefan | B60K 35/213 |
| 2022/0410932 A1* | 12/2022 | Braunstein | B60W 10/30 |
| 2023/0219417 A1* | 7/2023 | Park | G06F 3/04886 |
| | | | 345/175 |

* cited by examiner

*Primary Examiner* — Thanh T Vu
(74) *Attorney, Agent, or Firm* — Price Heneveld LLP; Brian James Brewer

(57) ABSTRACT

A monitoring system for a vehicle communicates with a user interface and includes a vision system that has a sensor configured to capture a presence of at least one vehicle occupant. A control system includes a processor configured to determine that the at least one vehicle occupant is attempting to interface with a user menu and determine a seating location of a first vehicle occupant attempting to interface with the user interface. The processor is further configured to categorize the first vehicle occupant attempting to interface with the user interface by the seating location and transmit an instruction to generate the user menu on the user interface specific to the categorization.

10 Claims, 12 Drawing Sheets

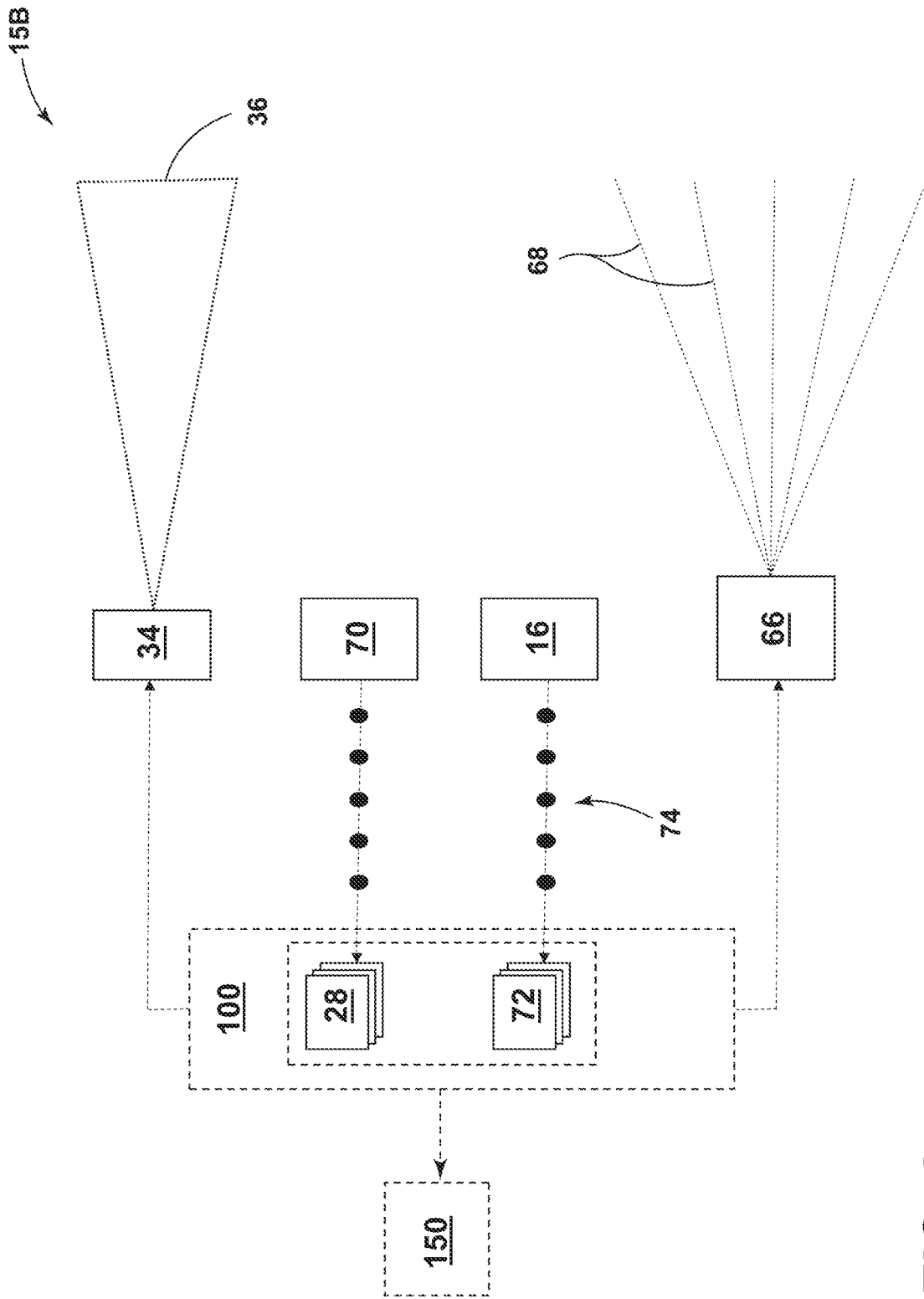

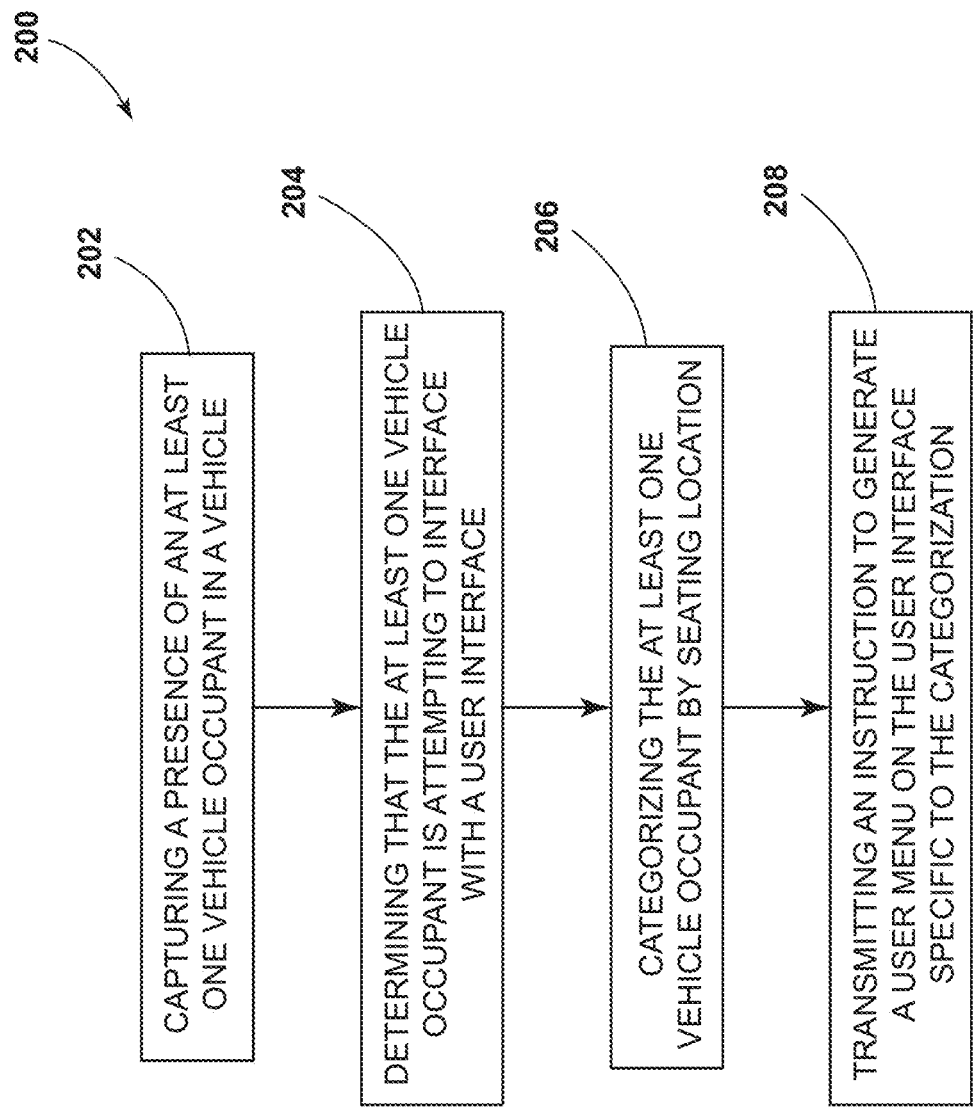

MONITORING SYSTEM WITH DYNAMIC USER MENU FEATURES

FIELD OF THE DISCLOSURE

The present disclosure generally relates to a monitoring system and, more particularly, to a monitoring system configured to categorize a vehicle occupant and generate a user menu based on the categorization of the vehicle occupant.

SUMMARY OF THE DISCLOSURE

According to one aspect of the present disclosure, a monitoring system for a vehicle communicates with a user interface and includes a vision system that has a sensor configured to capture a presence of at least one vehicle occupant. A control system includes a processor that is configured to determine that the at least one vehicle occupant is attempting to interface with a user menu and determine a seating location of the first vehicle occupant attempting to interface with the user interface. The processor is further configured to categorize the first vehicle occupant attempting to interface with the user interface by the seating location and transmit an instruction to generate the user menu on the user interface specific to the categorization.

According to another aspect of the present disclosure, a monitoring system for a vehicle communicates with a user interface and includes a vision system that has at least one imaging device configured to capture a first image type of at least one vehicle occupant. A control system includes a processor that is configured to determine that the at least one vehicle occupant is attempting to interface with a user interface and determine a seating location of the vehicle occupant attempting to interface with the user interface with the first image type. The processor is further configured to categorize the vehicle occupant attempting to interface with the user interface by the seating location and transmit an instruction to generate a user menu on the user interface specific to the categorization.

According to yet another aspect of the present disclosure, a monitoring system for a vehicle communicates with a user interface and includes a vision system that has at least one imaging device configured to capture at least one image type of a vehicle occupant. A control system includes a processor that is configured to extrapolate a 3-dimensional ("3D") representation of the vehicle occupant from the at least one image type and categorize the vehicle occupant by a seating location of the 3D representation. The processor is further configured to identify that the vehicle occupant is reaching for the user interface and transmit an instruction to generate a user menu on the user interface specific to the categorization.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 8 is a schematic view of a vision system including a second construction in accordance with an aspect of the present disclosure;

FIG. 11 is a flow chart illustrating a method of operating the monitoring system in accordance with an aspect of the present disclosure.

DETAILED DESCRIPTION

Figure 1:
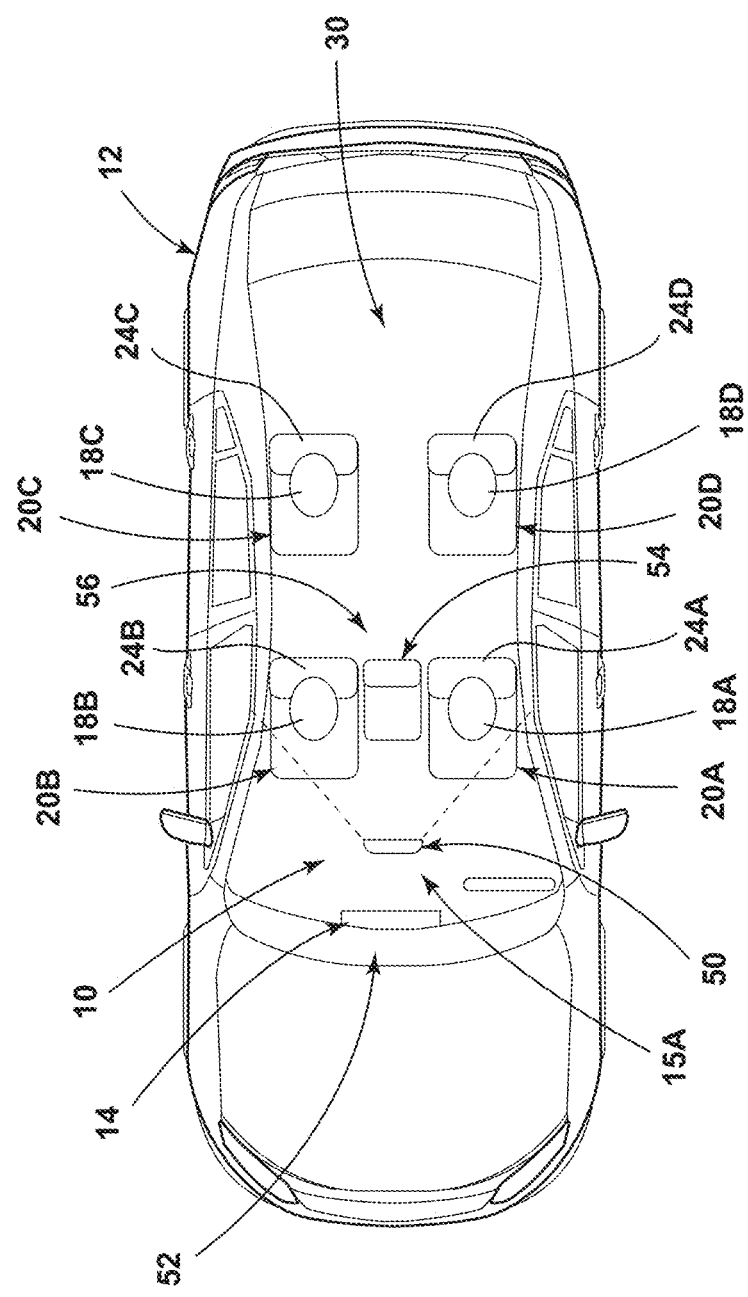
FIG. 1 is a top plan view of a vehicle that incorporates a monitoring system in accordance with an aspect of the present disclosure.

The present illustrated embodiments reside primarily in combinations of method steps and apparatus components related to a monitoring system configured to categorize a vehicle occupant and generate a user menu based on the categorization of the vehicle occupant. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front"

shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-7D, 10, and 11, reference numeral 10 generally designates a monitoring system for a vehicle 12 that communicates to a user interface 14 within the vehicle 12. The monitoring system 10 includes a vision system 15A that has a sensor 16 (FIG. 2) configured to capture a presence of at least one vehicle occupant 18A-18D. A control system 100 includes a processor 104 configured to determine that a first vehicle occupant 18A of the at least one vehicle occupant 18A-18D is attempting to interface (i.e., touch interface) with the user menu and determine a seating location 20A-20D of the first vehicle occupant 18A attempting to interface with the user interface 14. The processor 104 is further configured to categorize the first vehicle occupant 18A attempting to interface with the user interface 14 by the seating location 20A-20D and transmit an instruction to generate a user menu 22 (FIG. 2) on the user interface 14 specific to the categorization.

With continued reference to FIGS. 1-7D, 10, and 11, the categorization may include a passenger categorization and a driver categorization. More particularly, the user menu 22 generated specific to the driver categorization may be different than the user menu 22 generated specific to the passenger categorization. In this manner, based on the categorization, different options may be generated on the user menu 22 that relate to controlling features specific to the region (e.g., seating location 20A-20D) of the at least one vehicle occupant 18A-18D and/or additional features that are appropriate to only one of the passenger categorization or the driver categorization. For example, features specific to the region of the at least one vehicle occupant 18A-18D may include features related to adjusting a seat 24A-24D specific to the seating location 20A-20D, a temperature regulation specific to the seating location 20A-20D, and/or additional features that are specific to a region in the vehicle 12 that will be described in greater detail below. The features that are appropriate to only one of the passenger categorization or the driver categorization, on the other hand, may be appropriate on the basis of safety, driving rules and regulations (e.g., regionally specific), and/or the like. For example, if the vehicle 12 is in motion, certain features may not be accessible to the first vehicle occupant 18A with a driver categorization because the features are inappropriate, such as the availability of pairing a mobile device 26 (FIG. 10), obtaining GPS directions, video calls, exploring media, and/or the like. Because features that are appropriate on the basis of categorization are generated by the control system 100 (e.g., the processor 104), the control system 100 can be updated on the basis of safety concerns, updated driving rules and regulations, regionally specific driving rules and regulations (e.g., on the basis of GPS coordinates of the vehicle 12), and/or the like. As will be described in greater detail below, the processor 104 may be configured to determine that the at least one vehicle occupant 18A-18D is attempting to interface (i.e., touch interface) with the user interface 14 by one of proximity of the at least one vehicle occupant 18A-18D reaching for the user interface 14 or by the at least one vehicle occupant 18A-18D directly interfacing with the user interface 14.

With reference now to FIGS. 1-5, the sensor 16 may be configured as an imaging device, such as a camera that is configured to capture an image type 28 (e.g., a first image type 28). The control system 100 (e.g., the processor 104) may be configured to determine the seating location 20A-20D with the image type 28 when categorizing the at least one vehicle occupant 18A-18D. In some embodiments, the image type 28 may include two-dimensional ("2D") information (FIG. 5) about an interior cabin 30 of the vehicle 12. For example, the 2D information may include a 2D representation 31 (e.g., a 2D skeletal representation) of the at least one vehicle occupant 18A-18D. In some embodiments, the image type 28 may include a plurality of image types 28 captured in a sequence 32. The control system 100 (e.g., the processor 104) may be configured to identify that the at least one vehicle occupant 18A-18D is reaching for the user interface 14 based on the sequence 32 or an individual image type 28 and generate the user menu 22 specific to the categorization before the at least one vehicle occupant 18A-18D interfaces with the user interface 14. In some embodiments, the monitoring system 10 may include a flood illumination source 34 that projects a flood illumination 36 within the interior cabin 30. The flood illumination 36 may include light in the visible and/or infrared spectrum such that the sensor 16 (e.g, imaging device) captures the flood illumination 36 in the image type 28. In this manner, the image type 28 can include 2D information about the interior cabin 30 in low light conditions.

Figure 3C:
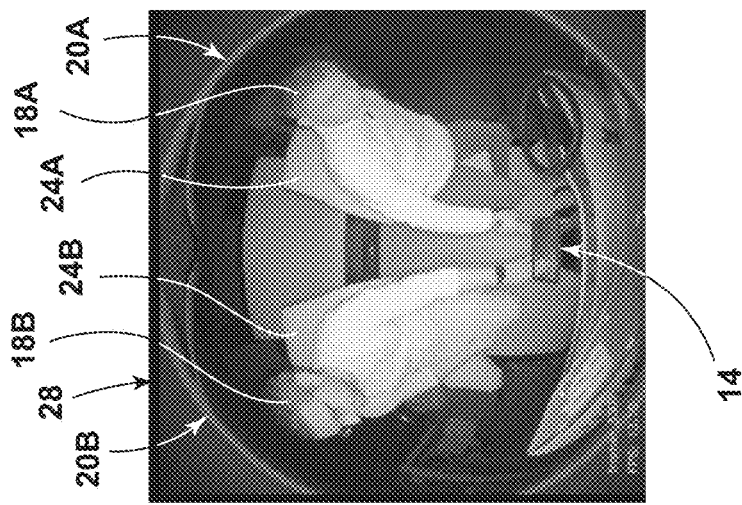
FIG. 3C is a first image type of an interior rear view of a vehicle that incorporates a monitoring system and a user interface in simultaneous use by a passenger and a driver of the vehicle in accordance with an aspect of the present disclosure.
Figure 3B:
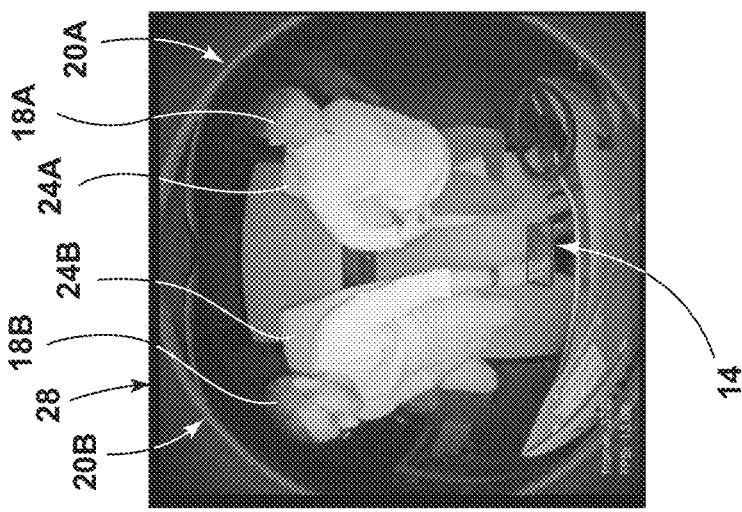
FIG. 3B is a first image type of an interior rear view of a vehicle that incorporates a monitoring system and a user interface in use by a passenger of the vehicle in accordance with an aspect of the present disclosure.
Figure 3A:
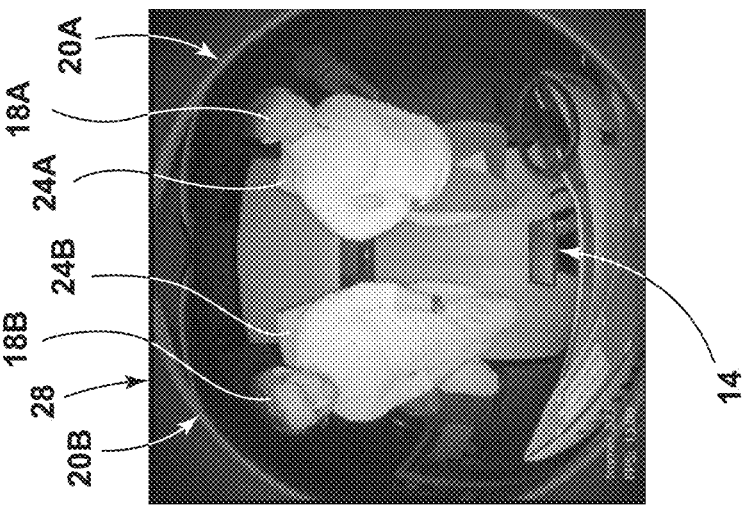
FIG. 3A is a first image type of an interior rear view of a vehicle that incorporates a monitoring system and a user interface in accordance with an aspect of the present disclosure.

With reference now to FIGS. 3A-3C, a sequence 32 of the first image types 28 are illustrated sequentially. More particularly, in FIG. 3A, none of the vehicle occupants 18A-18D are interfacing with the user interface 14. In FIG. 3B, a vehicle occupant 18B that has a passenger categorization is attempting to interface (i.e., touch interface) with the user interface 14. In this manner, the control system 100 (e.g., the processor 104) may determine that the vehicle occupant 18B is attempting to interface (i.e., touch interface) with the user interface 14 (e.g., through direct interfacing), categorize the vehicle occupant 18B, and transmit an instruction to generate the menu 22. In FIG. 3C, two vehicle occupants 18A, 18B that have different categorizations are attempting to simultaneously interface with the user interface 14. In this manner, the control system 100 (e.g., the processor 104) may determine that the vehicle occupants 18A, 18B are both attempting to interface (i.e., touch interface) with the user interface 14 (e.g., through direct interfacing), categorize the vehicle occupants 18A, 18B, and transmit an instruction to generate the menu 22 with a region controllable by one of the vehicle occupants 18A and a region controllable by the second vehicle occupant 18B. As will be described in greater detail below, a menu 22 may be generated for more than one of the vehicle occupants 18A-18D.

With reference now to FIGS. 1-6, the control system 100 (e.g., the processor 104) may be configured to measure a depth of the 2D representation 31 (e.g., the 2D skeletal representation) and extrapolate a 3-dimensional ("3D") representation 33 (e.g., a 3D skeletal representation) of the at least one vehicle occupant 18A-18D interfacing with the user interface 14 by reviewing the captured presence obtained by the sensor 16. Based on the 3D representation 33, the control system 100 (e.g., the processor 104) may be configured to categorize the at least one vehicle occupant 18A-18D interfacing with the user interface 14 by the seating location of the 3D representation 33 (e.g., the 3D skeletal representation). The control system 100 (e.g., the processor 104) may be configured to identify that the 2D representation 31 (e.g., 2D skeletal representation) and/or the 3D representation 33 (e.g., the 3D skeletal representation) is reaching for the a user interface 14 based on the sequence 32 of the image types 28 or a specific one of the image types 28 and generate the user menu 22 specific to the categorization before the at least one vehicle occupant 18A-18D touch interfaces with the user interface 14.

Figure 4:
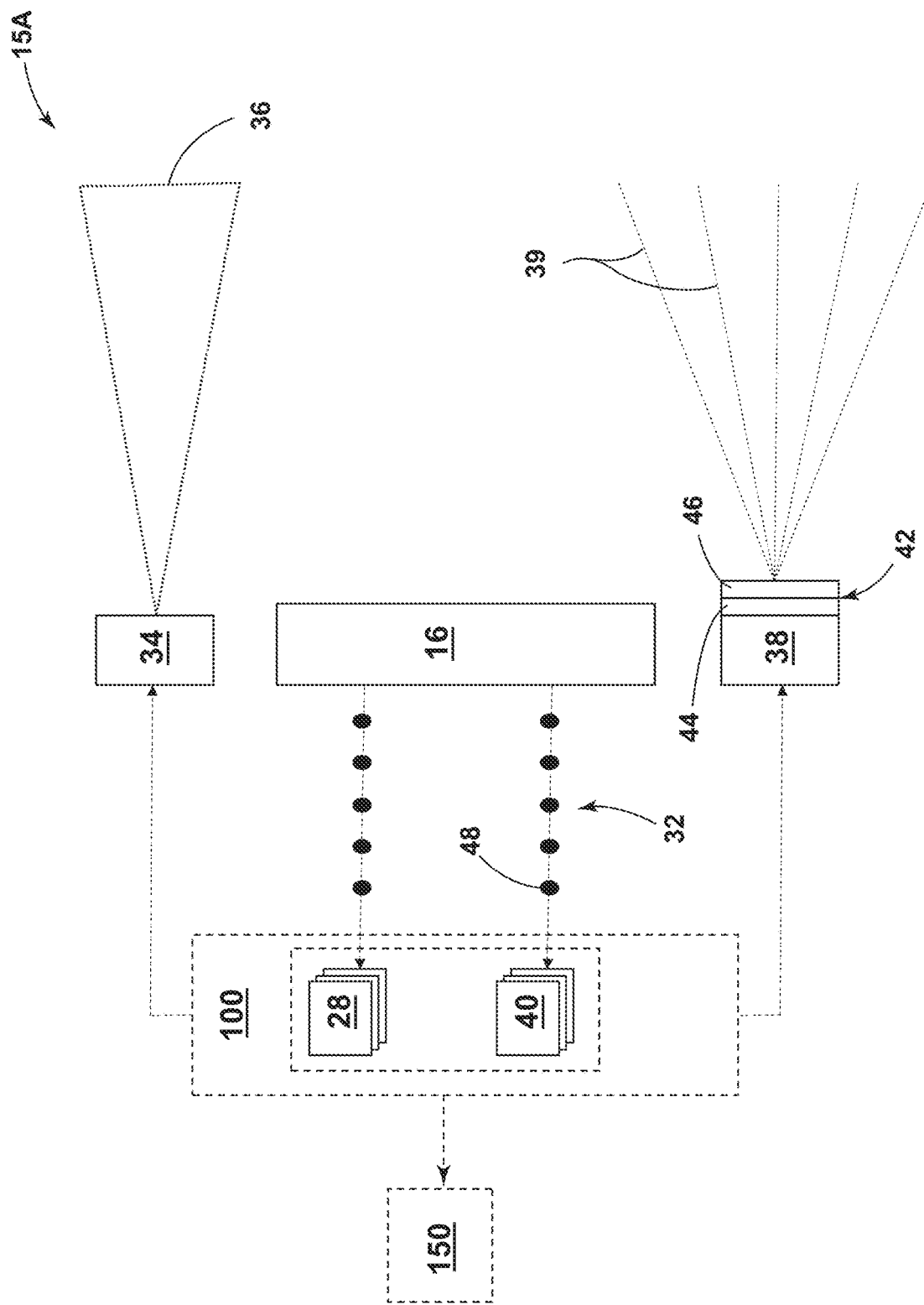
FIG. 4 is a schematic view of a vision system including a first construction in accordance with an aspect of the present disclosure.
Figure 5:
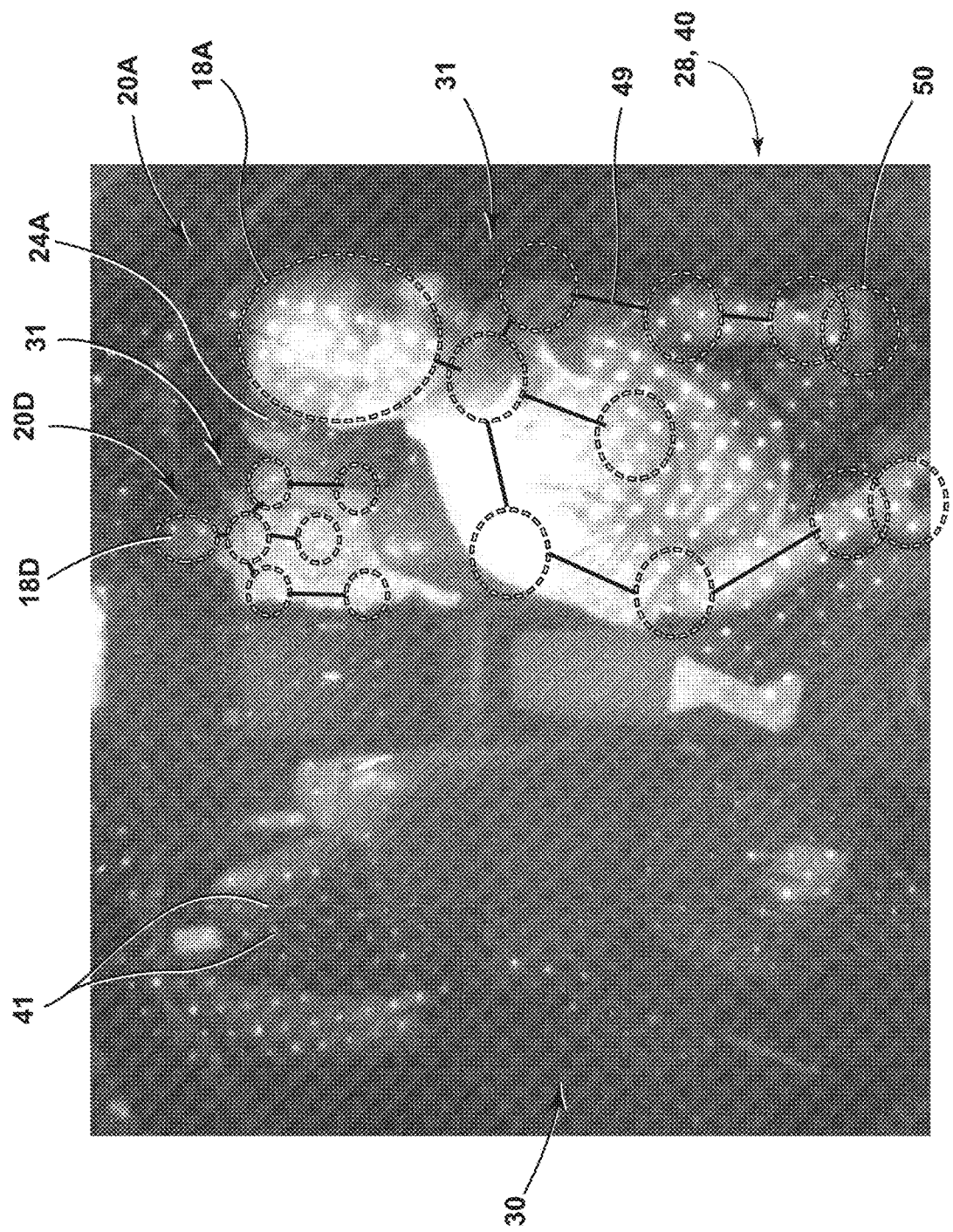
FIG. 5 is a view of a first image type overlaid over a structured image type of a vehicle interior cabin in accordance with an aspect of the present disclosure.

With reference now to FIG. 4, the vision system 15A is configured under a first construction and may include a structured light source 38 and operates under the principles of structured light. Under the principles of structured light, the structured light source 38 projects a structured light illumination 39 substantially within the infrared spectrum. The structured light illumination 39 may be captured in a structured image type 40. In some embodiments, the structured light illumination 39 is distributed as a light spot array with a plurality of light spots 41 (FIG. 5). More particularly, the structured light source 38 may include a least one laser diode (e.g., a plurality of laser diodes) and an optical lens 42. The optical lens 42 may include a collimation element 44 and a diffractive element 46. The collimation element 44 and the diffractive element 46 may be integrally or separately formed.

In some embodiments, the sensor 16 (e.g, imaging device) includes a single imaging device that captures the first image type 28 and the structured image type 40 such that the sequence 32 includes capturing the first image type 28 and the structured image type 40 within alternating periods of time as designated by reference numeral 48. The periods of time 48 between capturing the first image type 28 and the structured image type 40 may be less than a centisecond, less than 75 milliseconds, between 75 milliseconds and 25 milliseconds, about 50 milliseconds, or less than 50 milliseconds. In this manner, the sensor 16 (e.g, imaging device) may capture a plurality of the first image type 28 and the structured image type 40 in accordance with the sequence 32. However, it should be appreciated that the at least one sensor 16 (e.g, imaging device) may include two or more imaging devices such that the first image type 28 and the structured image type 40 are captured simultaneously in the sequence 32. In some embodiments, the 2D representation 31 of the at least one vehicle occupant 18A-18D may be extracted from the structured image type 40 rather than the first image type 28.

The control system 100 (e.g., the processor 104) may be configured to process the 2D representation 31 of the at least one vehicle occupant 18A-18D to detect locations within the structured image type 40 that correspond to body parts (e.g., arms 49 and hands 51) of the at least one vehicle occupant 18A-18D to extract the 2D skeletal representation. In this manner, the process of extrapolating the 3D skeletal representation from the 2D representation 31 and, more particularly, the 2D representation 31 may be entirely on the basis of the structured image type 40. In this manner, it is contemplated that the operation of the vision system 15A may be completed with only the structured image type 40 (e.g., the structure light illumination 39) such that the flood illumination source 34 may be absent or otherwise not utilized for extracting the 2D representation 31 and, consequently, the 3D representation 33. By detecting body parts, such as arms 49 and hands 51, the control system 100 (e.g., the processor 104) may be configured to accurately identify that the at least one vehicle occupant 18A-18D is reaching for the user interface 14 and generate the user menu 22 specific to the categorization before the at least one vehicle occupant 18A-18D interfaces with the user interface 14.

With continued reference to FIG. 4, under the principles of structure light, the control system 100 (e.g., the processor 104) may be configured to measure a depth of the 2D representation 31 with the depth information. The depth information may be obtained based on the principles of triangulation and known geometries between sensor 16 (e.g, imaging device), the structured light source 38, and the distribution of the structured light illumination 39 (e.g., the light spot array). For example, the processor 104 may be configured to determine movement based on an outer perimeter or a center of gravity of each light spot 41. The sensor 16 (e.g, imaging device) and the structured light source 38 may be closely and rigidly fixed on a common optical bench structure (e.g., within a rearview mirror assembly 50 or other shared location within the interior cabin 30) and, based on the known spacing between the sensor 16 (e.g, imaging device) and the structured light source 38 (e.g., the laser diodes) and distribution of the structured light illumination 39, the light spot 41 is reflected from the at least one vehicle occupant 18A-18D and captured along an epipolar line, which, in turn, can be triangulated to extract a depth of the at least one vehicle occupant 18A-18D.

Figure 6:
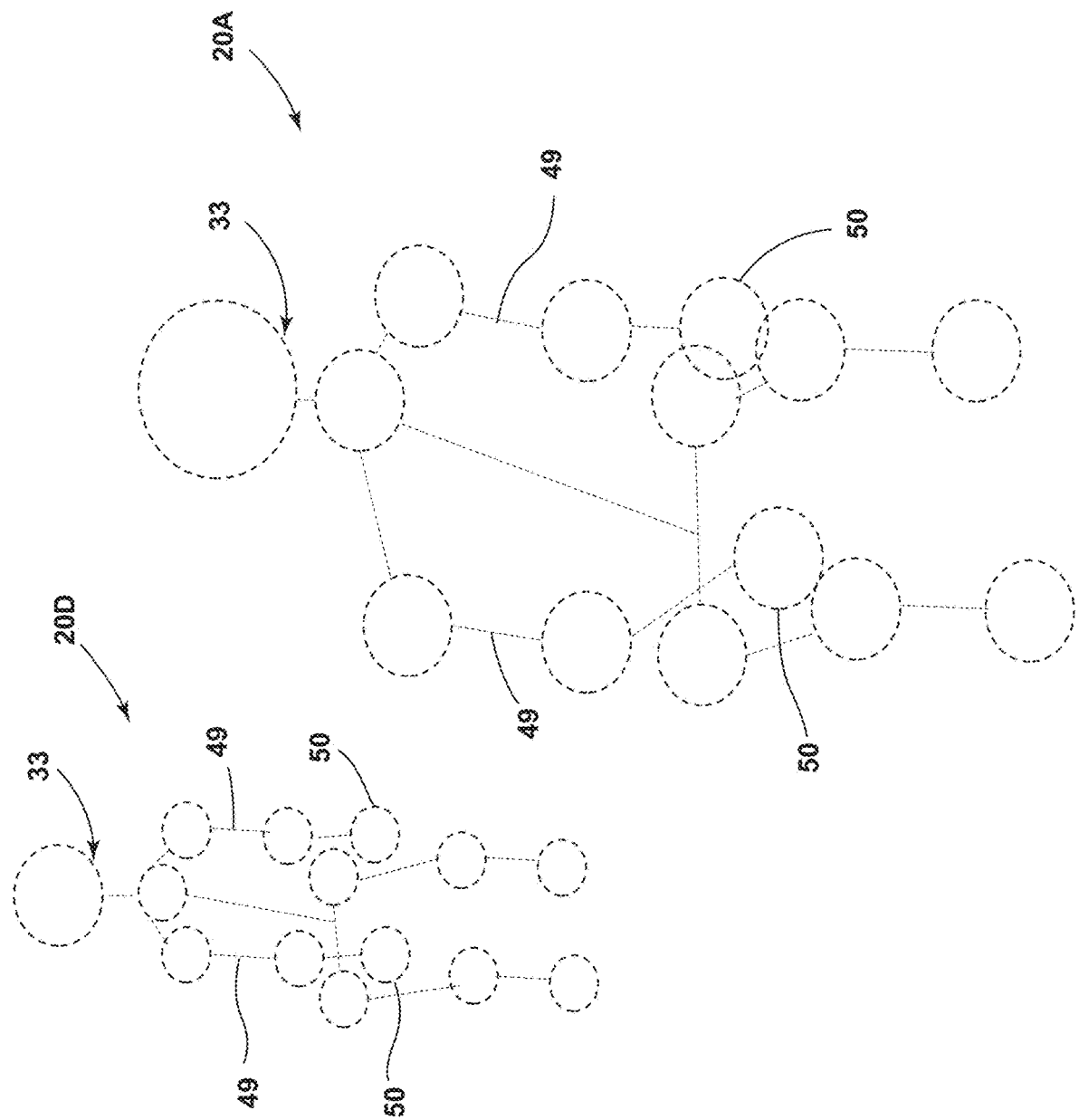
FIG. 6 is a schematic view of two 3-dimensional ("3D") skeletal representations of vehicle occupants in accordance with an aspect of the present disclosure.

With reference now to FIGS. 4-6, the depth of the at least one vehicle occupant 18A-18D (e.g., arms 49 and hands 51) at each light spot 41 can then be used to extrapolate the 3D representation 33 (e.g., the 3D skeletal representation). Likewise, changes in depth of the at least one vehicle occupant 18A-18D can be used to extrapolate the present skeletal posture, and movement of the 3D representation 33 to identify that the at least one vehicle occupant 18A-18D is attempting to interface (i.e., touch interface) with the user interface 14. It should be appreciated that, in some embodiments, the monitoring system 10 may not include the flood illumination source 34 and may instead rely on ambient lighting received from an environment. In this manner, in some embodiments, the at least one sensor 16 (e.g, imaging device) may be configured to capture red, green, and blue ("RGB") information (e.g., light captured substantially in the visible spectrum) in the first image type 28 and the 2D representation 31 can be extracted from the RGB information.

With reference now to FIGS. 1-3C and 7A-7C, the menu 22 generated includes options 58A-58C specific to the categorization. In this manner, it should be appreciated that the user interface 14 may be a touch screen device or a display device with control buttons 59. In some embodiments, there may be additional categorizations other than the passenger categorization and a driver categorization. For example, the user interface 14 may include a pair of user interfaces 14, 54 with the user interface 14 (e.g., a first user interface 14) in a front portion 52 (e.g., a dashboard) and a second user interface 54 in a rear portion 56 (e.g., behind a front row arm rest). In this manner, some options 58A-58C may be available to only the passengers, only some of the passengers, and/or only the driver. Moreover, in some embodiments, the options 58A-58C may be customizable. For example, if one or more of the at least one vehicle occupant 18B-18D other than the first vehicle occupant 18A are children, it may be preferable to prevent opportunities to those vehicle occupants 18B-18D to control certain features of the vehicle 12, such as speaker volume, emergency calls, seat adjustments, and/or the like.

Figure 2:
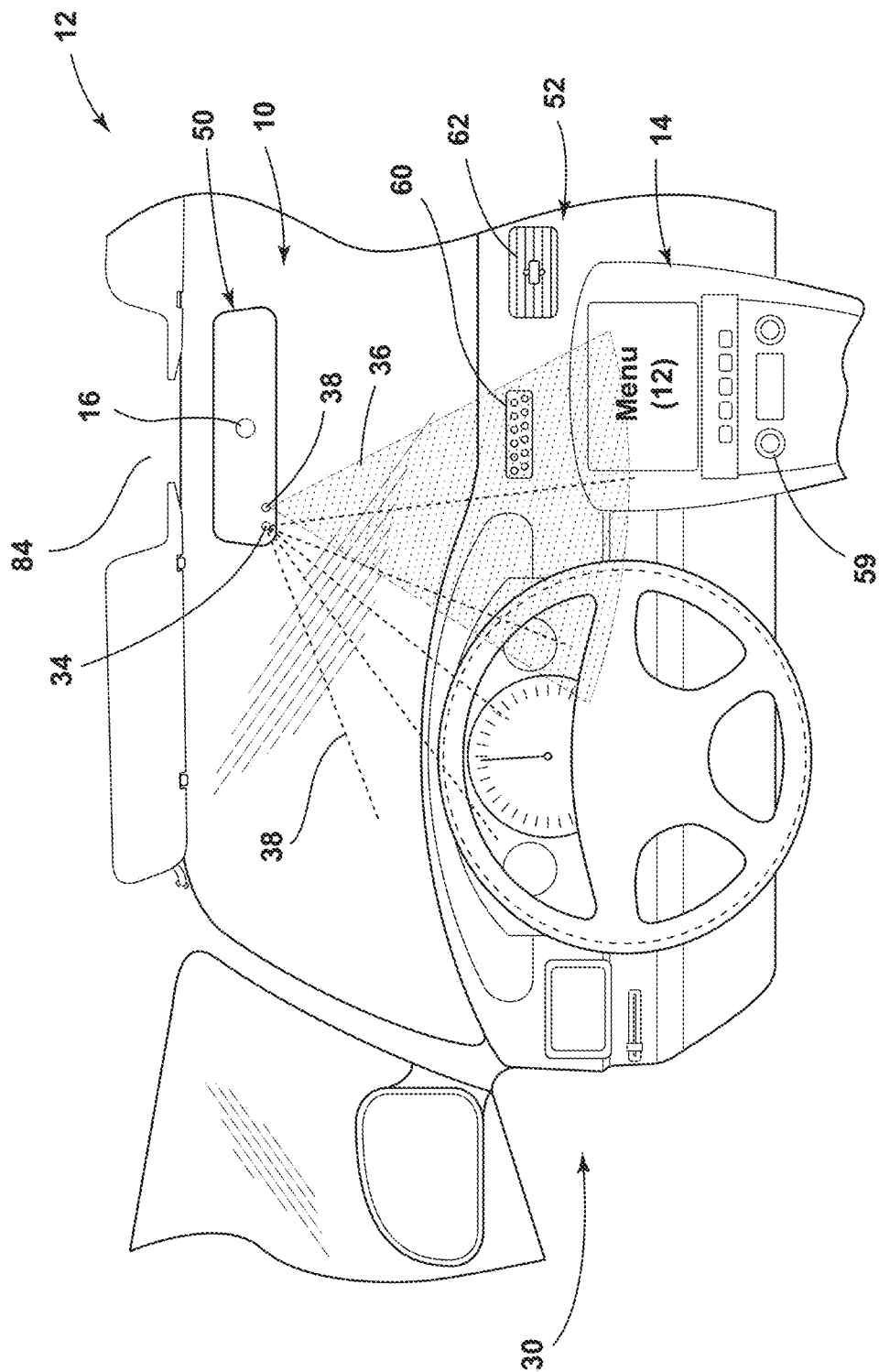
FIG. 2 is an interior front view of a vehicle that incorporates a monitoring system in accordance with an aspect of the present disclosure.
Figure 7C:
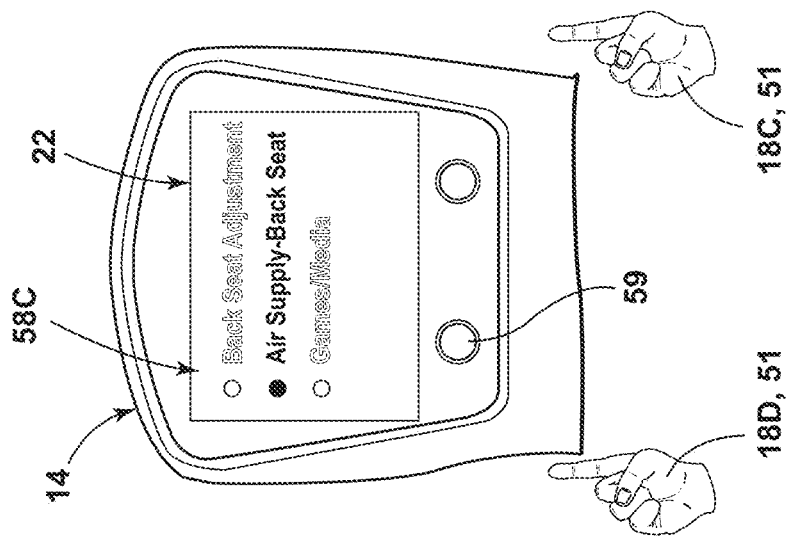
FIG. 7C is a front view of a user interface including a menu with a third set of options in accordance with an aspect of the present disclosure.
Figure 7B:
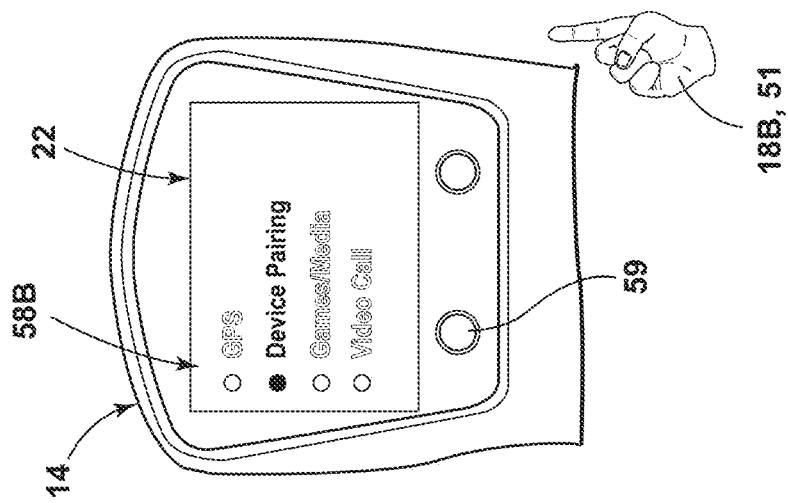
FIG. 7B is a front view of a user interface including a menu with a second set of options in accordance with an aspect of the present disclosure.
Figure 7A:
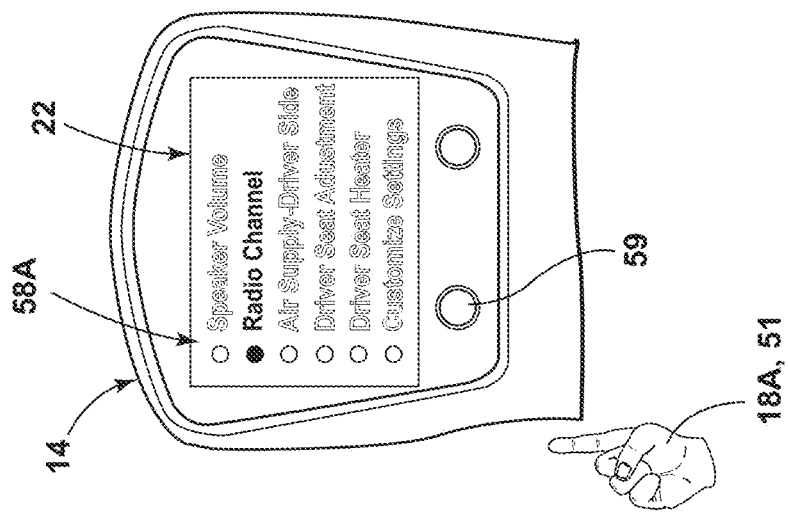
FIG. 7A is a front view of a user interface including a menu with a first set of options in accordance with an aspect of the present disclosure.
Figure 7D:
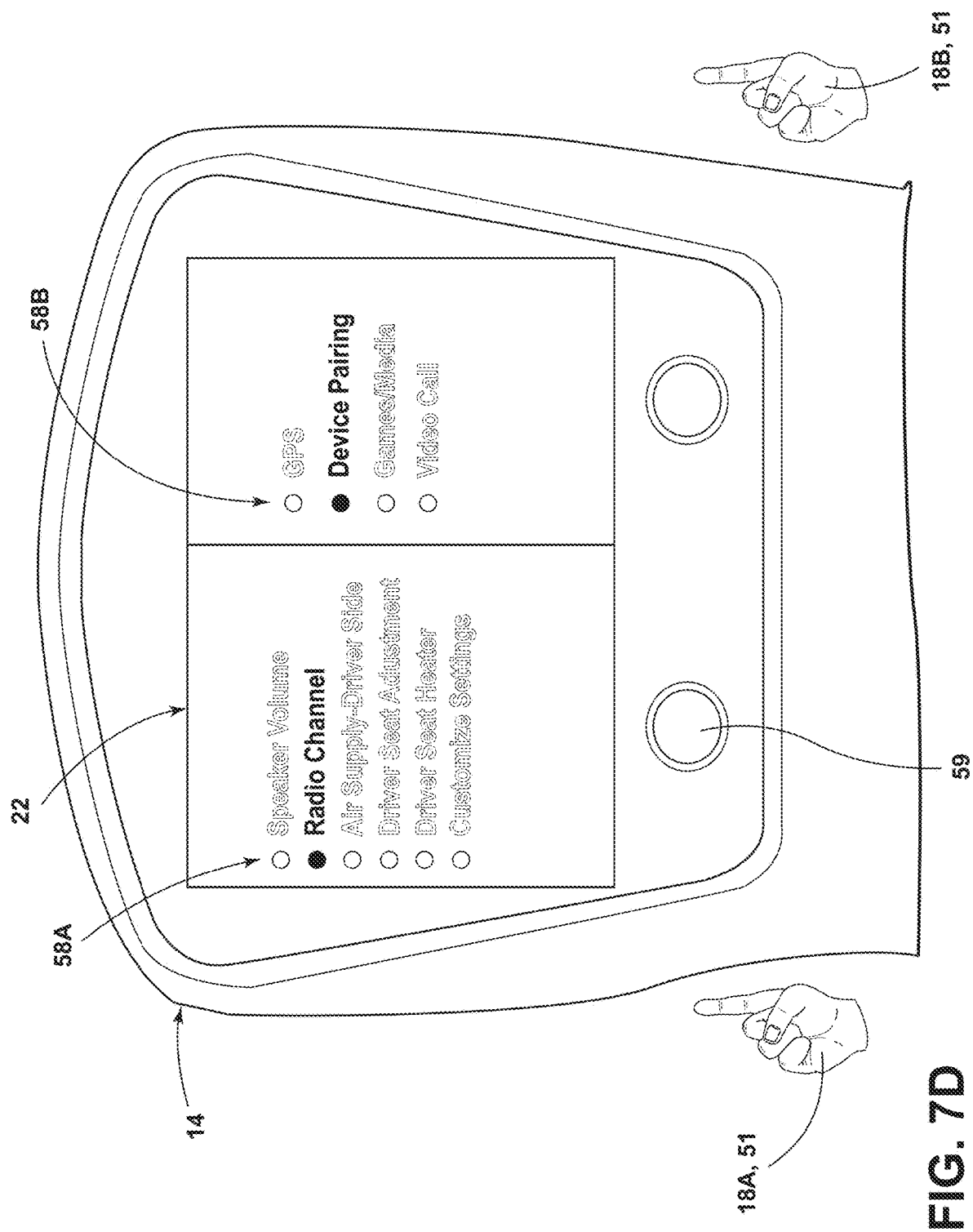
FIG. 7D is a front view of a user interface including a menu with a first and second set of options in accordance with an aspect of the present disclosure.

With reference now specifically to FIGS. 1, 2 and 7A, the menu 22 is shown generated on the user interface 14 with a first set of options 58A corresponding to the driver categorization of the first vehicle occupant 18A (e.g., the driver). The first set of options 58A may control features that are specific to a first seating location 20A corresponding to a first seat 24A (e.g., the driver's seat) and/or features that are appropriate for the driver to control. While the first vehicle occupant 18A (e.g., the driver) is illustrated as being seated to the left of the user interface 14, it should be appreciated that because the control system 100 (e.g., the processor 104) includes instructions for which of the options 58A-58C are generated, the instructions (e.g., software) can be updated in regions where the driver's seat 24A is to the right side of the user interface 14. By way of non-limiting examples, features that are specific to a first seating location 20A may include a volume of speakers 60, radio channel selection, temperature regulation by means of a heat, ventilation, and air conditioning ("HVAC") system 62, a seat warmer located within the first seat 24A, adjustment of the first seat 24A, and the ability to customize settings (e.g., which options 58A-58C are generated based on categorization). As it relates to features that are appropriate for the first vehicle occupant 18A to control, these features may vary based on a condition of the vehicle 12 (e.g., whether or not it is in motion), locality of the vehicle 12 (e.g., what local rules and regulations require), and/or other safety parameters. For example, if the vehicle 12 is in motion, certain features, such as a direction search with a global positioning system ("GPS") 64, pairing a mobile device 26, games/media access, and video calls, may be unavailable until the vehicle 12 is parked or, otherwise, autonomously controlled. Similarly, the GPS 64 provides location information of the vehicle 12 that can impact what local rules and regulations require to further modify which of the first options 58A are available. For example, certain regions may permit certain features to be used by the first vehicle occupant 18A that other locations do not, for example, the direction search on the GPS 64, video calls, and/or the like.

With reference now specifically to FIGS. 1, 2, 3B, and 7B, the menu 22 is shown with a second set of options 58B corresponding to the passenger categorization of a second vehicle occupant 18B (e.g., a front seat passenger). The second set of options 58B may control features that are specific to a second seating location 20B corresponding to a second seat 24B (e.g., a front passenger seat) and/or features that are appropriate for the second vehicle occupant 18B to control. The second set of options 58B may be the same as the first set of options 58A but differ in respect to features that are specific to the second seating location 20B (e.g., a seat warmer in the second seat 24B, temperature regulation by means of the HVAC system 62 specific to the second seating location 20B, adjustment of the second seat 24B, and/or the like. The second set of options 58B may also not be limited to the condition of the vehicle 12 (e.g., whether or not it is in motion) like the first set of options 58A. For example, those features that can only be controlled by the first vehicle occupant 18A when the vehicle 12 is not in motion may be controlled by the second vehicle occupant 18B (e.g., the front seat passenger) without limitation (e.g., other than customized settings).

With reference now specifically to FIGS. 1, 2, and 7C, the menu 22 is shown with a third set of options 58C corresponding to the passenger categorization of a third and fourth vehicle occupant 18C, 18D (e.g., rear seat passengers). The third set of options 58C may control features that are specific to a third and fourth seating location 20C, 20D corresponding to a third and fourth seat 24C, 24D (e.g., integral or non-integral rear passenger seats) and/or features that are appropriate for the third and fourth vehicle occupants 18C, 18D to control. The second set of options 58C may be the same as the first set of options 58A, but differ in respect to a passenger sub-category (e.g., an adult passenger or a child passenger) and/or unique options on the second user interface 54. For example, the third set of options 58C may control heating the rear portion 56 of the vehicle 12, volume of speakers 60, radio channel selection, and/or the like. When one or more of the third and fourth vehicle occupants 18C, 18D have a passenger sub-category of a child, the third set of options 58C to control certain features of the vehicle may be further limited. For example, it may not be preferable to provide access in the third set of options 58C for children to control features, such as volume of speakers 60, emergency calls, radio channel selection, videos calls, pairing a mobile device 26, and/or the like. On the other hand, if the passenger sub-category is an adult passenger, providing access in the third set of options 58C to control these features may be allowed. In some embodiments, the passenger sub-category may be obtained by extrapolating a size of the 2D representation 31 (e.g., the 2D skeletal representation) and/or the 3D representation 33 (e.g., the 3D skeletal representation) in absolute scale with the vision system 15A.

With reference now to FIGS. 1, 2, 3C, and 7D, in some embodiments, more than one set of options 58A-58C may be generated on the same menu 22. For example, if the first vehicle occupant 18A and the second vehicle occupant 18B are interfacing with the user interface 14 or identified as reaching for the a user interface 14, simultaneously, the first and second set of user options 58A and 58B may be generated on the menu 22. In this manner, certain features can be controlled individually and simultaneously by the first and second vehicle occupants 18A and 18B.

With reference now to FIGS. 7A-7D, the features controlled in the set of options 58A-58C can eliminate the need to have separate human-user-interface mechanisms, such as traditional seat warming toggles, seat adjustment control mechanisms, and/or the like. However, it should be appreciated that these human-user-interface mechanisms may still be present in the vehicle 12 without departing from the subject disclosure.

Figure 9:
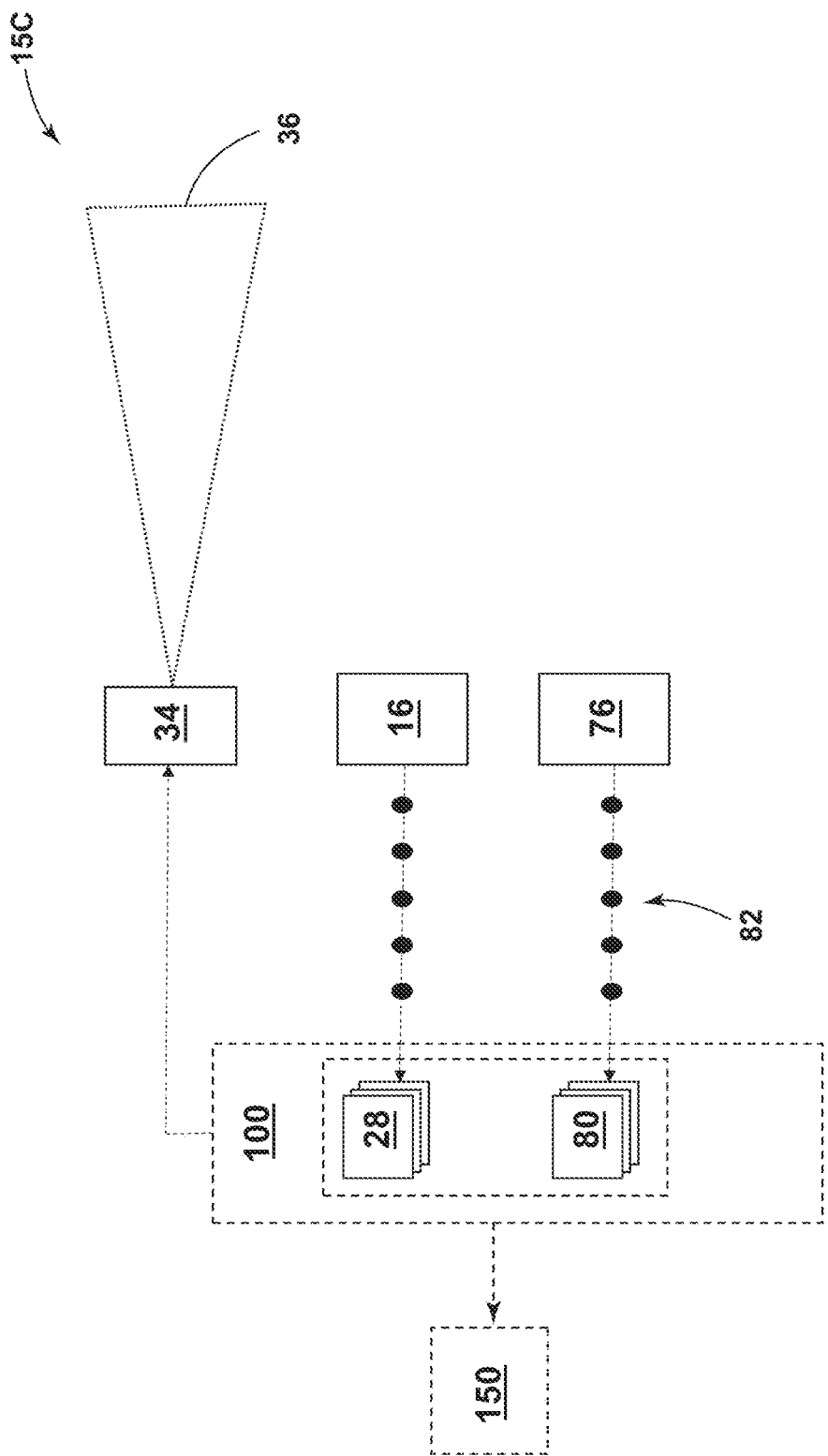
FIG. 9 is a schematic view of a vision system including a third construction in accordance with an aspect of the present disclosure.

With reference now to FIGS. 8 and 9, the monitoring system 10 may include other vision systems 15B, 15C that utilize components other than the structured light source 38 to obtain the 3D representation 33 (e.g., the 3D skeletal representation). The methodologies described in reference to FIGS. 4, 8, and 9 are exemplary in nature and other methodologies can be utilized without departing from the scope of the subject disclosure, such as Radio Detection and Ranging (RADAR applications) and other methodologies.

With reference now to FIG. 8, a vision system 15B is configured under a second construction and operates under the principles of Time-of-Flight ("ToF"). Unless otherwise explicitly indicated, the vision system 15B may include all of the components, functions, materials, and may be implemented in the same structures of the vehicle 12 as the other constructions. However, the vision system 15B may include a beam illumination source 66 (e.g., at least one laser diode and/or LED) that is configured to emit a beam illumination 68 (in modulated pulses or continuously emitted). The vision system 15B includes the sensor 16 and a second imaging device 70. The second imaging device 70 is configured to capture the flood illumination 36 from the flood illumination source 34 in the first image type 28, and the sensor 16 is configured to capture the beam illumination 68 in a beam image type 72. The control system 100 (e.g., the processor 104) is configured to extract the 2D representation 31 (e.g., the 2D skeletal representation) of the at least one vehicle occupant 18A-18D from the first image type 28, measure a depth of the 2D representation 31 with the beam image type 72, and extrapolate the 3D representation 33 (e.g, the 3D skeletal representation) of the at least one vehicle occupant 18A-18D. However, in some embodiments, the second imaging device 70 may be configured to capture the 2D representation 31. In this manner, the processor 104 may be configured to extract the 2D representation 31 from the beam image type 72 rather than requiring additional sensors, imaging devices, image types.

With continued reference to FIG. 8, the control system 100 (e.g., the processor 104) may be configured to extract the 2D representation 31 in accordance with the locations in the first image type 28 of the body parts (e.g., arms 49 and hands 51) of at least one vehicle occupant 18A-18D. The beam image type 72, on the other hand, includes depth information that can be overlaid on the 2D representation 31. More particularly, under the principles of ToF, the control system 100 (e.g., the processor 104) may be configured to measure a depth of the 2D representation 31 with the depth information. The depth information may be obtained based on the principles of a time difference between the emission of the beam illumination 68 in modulated pulses and the return of the beam illumination 68 back to the sensor 16, after being reflected from the at least one vehicle occupant 18A-18D. The depth information may also be obtained by measuring the phase shift of the emission of the beam illumination 68 in continuous emission. In this manner, the sensor 16 and the second imaging device 70 may capture the first image type 28 and the beam image type 72 simultaneously in a sequence 74. It should be appreciated that, in some embodiments, the vision system 15B may not include the flood illumination source 34 and may, instead, rely on ambient lighting received from an environment. By detecting body parts, such as arms 49 and hands 51, the control system 100 (e.g., the processor 104) may be configured to accurately identify that the at least one vehicle occupant 18A-18D is reaching for the user interface 14 and generate the user menu 22 specific to the categorization before the at least one vehicle occupant 18A-18D interfaces with the user interface 14.

With reference now to FIG. 9, a vision system 15C is configured under a third construction and operates under the principles of stereo vision. Unless otherwise explicitly indicated, the vision system 15C may include all the components, functions, and materials, and may be implemented in the same structures of the vehicle 12 as the other constructions. However, the vision system 15C may include only the flood illumination source 34, the sensor 16 (e.g., an imaging device) and a second imaging device 76. The sensor 16 and the second imaging device 76 are both configured to capture the flood illumination 36. More particularly, the sensor 16 is configured to capture the first image type 28 and the second imaging device 76 is configured to capture a shifted image type 80 that is different from the first image type 28 in orientation. In this manner, the control system 100 (e.g., the processor 104) may be configured to extract first and second orientations of the 2D representation 31 in accordance with the locations in the first image type 28 and the shifted image type 80 of the body parts of the at least one vehicle occupant 18A-18D. More particularly, under the principles of stereovision, the control system 100 (e.g., the processor 104) may be configured to obtain depth information of the 2D representation 31 by measuring the position of the 2D representation 31 in the first image type 28 against the position of the 2D representation 31 in the shifted image type 80 along epipolar lines. The depth information may be obtained based on the principles of triangulation and known geometries between sensor 16 and the second imaging device 76 to extrapolate the 3D representation 33 (e.g., the 3D skeletal representation). In this manner, the sensor 16 and the second imaging device 76 may capture the first image type 28 and the shifted image type 80 simultaneously in a sequence 82. It should be appreciated that, in some embodiments, the vision system 15C may not include the flood illumination source 34 and the flood illumination 36 may be ambient lighting received from an environment.

Figure 10:
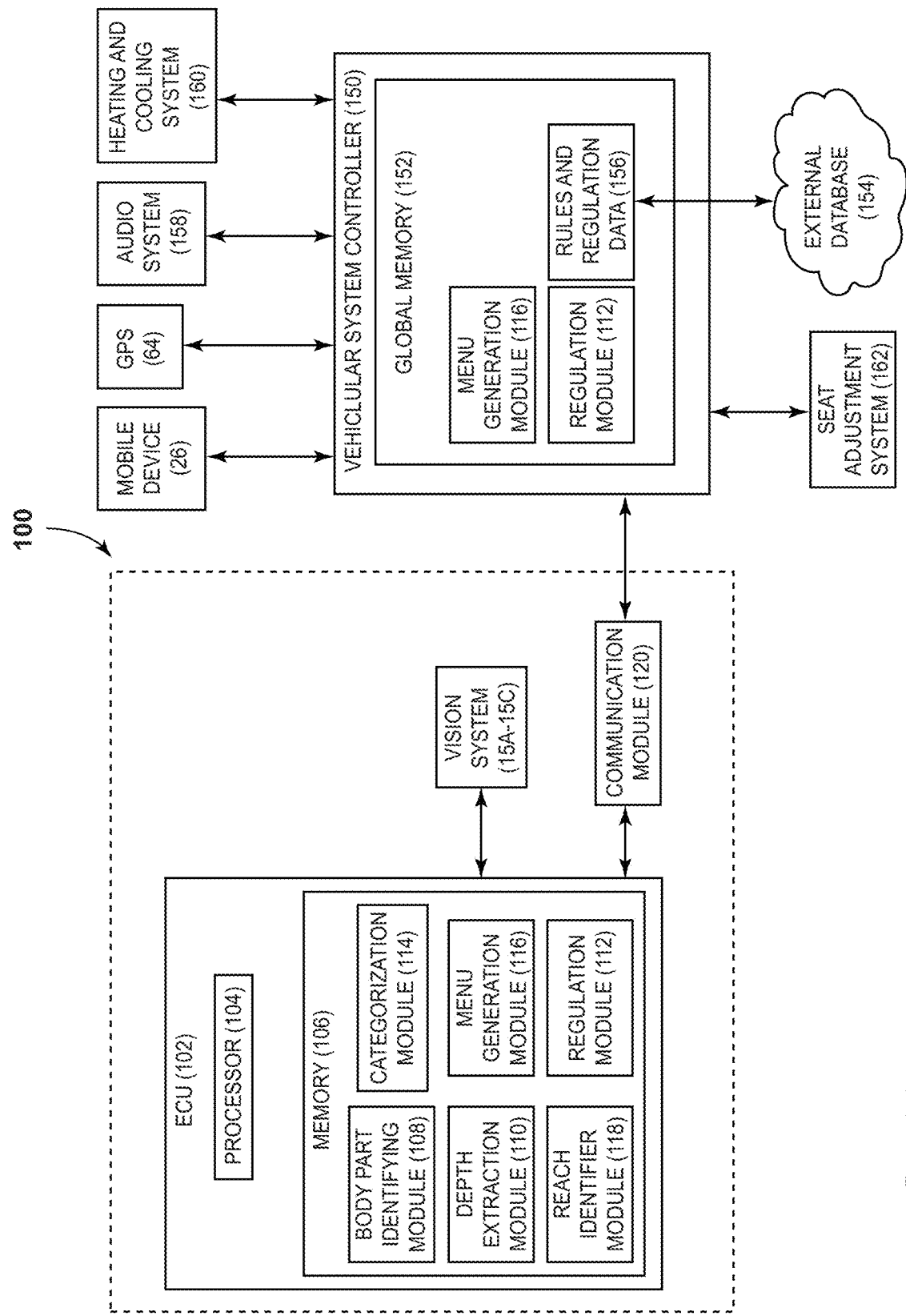
FIG. 10 is schematic view of a control system that controls functionalities of a monitoring system in accordance with an aspect of the present disclosure.

With reference now to FIG. 10, the control system 100 of the monitoring system 10 may include at least one electronic control unit (ECU) 102. The at least one ECU 102 may be located in rearview mirror assembly 50 and/or other structures in the vehicle 12. In some embodiments, components of the ECU 102 communicate with one another and are located in both the rearview mirror assembly 50 and other structures in the vehicle 12. The at least one ECU 102 may include the processor 104 and a memory 106. The processor 104 may include any suitable processor 104. Additionally, or alternatively, the ECU 102 may include any suitable number of processors, in addition to or other than the processor 104. The memory 106 may comprise a single disk or a plurality of disks (e.g., hard drives) and includes a storage management module that manages one or more partitions within the memory 106. In some embodiments, memory 106 may include flash memory, semiconductor (solid state) memory, or the like. The memory 106 may include Random Access Memory (RAM), a Read-Only Memory (ROM), Electrically Erasable Programmable Read-Only Memory (EEPROM), or a combination thereof. The memory 106 may include instructions that, when executed by the processor 104, cause the processor 104 to, at least, perform the functions associated with the components of the monitoring system 10. The vision systems 15A-15C may, therefore, be controlled by the control system 100. The memory 106 may, therefore, include a series of captured first image types 28 and a series of second image types (e.g., structured image type 40, beam image type 72, or shifted image type 80). The memory 106 may further include modules (e.g., instructions) that include a body part identifying module 108, a depth extraction module 110, a reach identifier module 112, a categorization module 114, a menu generation module 116, and a regulation module 118. The control system 100 may further include a communication module 120 that transmits the instruction to generate the menu 22 to the user interface 14.

The vehicle 12 may include one or more vehicular system controllers 150 communicating with the control system 100. In some embodiments, the vehicular system controller 150 includes a global memory 152 which receives information from the control system 100 and may receive information from an external database 154 (e.g., a cloud) that includes regionally specific driving rules and regulation data 156. The regionally specific driving rules and regulation data 156 may be received by the global memory 152 and stored locally in the memory 106 (e.g., the regulation module 118). In some embodiments, the global memory 152 may, alternatively or likewise, include a menu generation module 116 (e.g., which options 58A-58C are generated for a categorization) and a regulation module 118. In this manner, it should be appreciated that the processor 104 may be configured to transmit the instruction to generate the menu 22 directly to the user interface 14 or through the vehicular system controller 150. Similarly, the vehicular system controllers 150 may be in communication with an audio system 158 of the vehicle 12, a heating and cooling system 160 of the vehicle 12, and a seat adjustment system 162 of the vehicle 12.

With reference now to FIGS. 1-10, the components of the monitoring system 10 (e.g., the control system 100 and vision system 15A-15C) may be implemented into a variety of structures within the vehicle 12. For example, components of the vision system 15A-15C may be located within a rearview mirror assembly 50, an overhead console 84 (FIG. 2), the front portion 52 (e.g., the dashboard), and/or other locations within an interior cabin 30 of the vehicle 12. In some embodiments, the rearview mirror assembly 50 may include an electro-optic device (not shown). For example, the electro-optic device may be a single-layer component, a single-phase component, a multi-layer component, and/or a multi-phase component that can be switched between a partially transmissive state and a partially reflective state. In some embodiments, the rearview mirror assembly 50 may include a display. However, it should be appreciated that the monitoring system 10 may be incorporated into other structures with multiple user interfacing with a user interface. For example, the monitoring system 10 may be incorporated into an aircraft, a rail vehicle, a water vessel, and other structures.

With reference now to FIG. 11 a method 200 of operating the monitoring system 10 includes, at step 202, capturing a presence of at least one vehicle occupant 18A-18D in a vehicle 12. For example, a vision system 15A-15C may be located in or around an interior cabin 30 of the vehicle and be configured to capture the presence of the at least one vehicle occupant 18A-18D with a first image type 28 or a second image type 40, 72, 80. At step 204, the method 200 includes determining that the at least one vehicle occupant 18A-18D is attempting to interface (i.e., touch interface) with a user interface 14. For example, the processor 104 may receive a signal (e.g., from the user interface 14) that the at least one vehicle occupant 18A-18D is interfacing with the user interface 14. In other examples, the processor 104 may be configured to determine (e.g., with a reach identifier module 112) that the at least one vehicle occupant 18A-18D is reaching for the user interface 14. More particularly, the processor 104 may be configured to utilize a body part identifying module 108 to determine that the at least one vehicle occupant 18A-18D is reaching for the user interface 14 (e.g., with a 2D representation 31) and/or further utilize a depth extraction module 110 to determine that the at least one vehicle occupant 18A-18D is reaching for the user interface 14 (e.g., a 3D representation). At step 206, the method 200 includes categorizing the at least one vehicle occupant 18A-18D by seating location 20A-20D. For example, the seating location 20A-20D of the at least one vehicle occupant 18A-18D may be obtained by the vision system 15A-15C in conjunction with the processor 104 executing the categorization module 114. At step 208, the method 200 includes transmitting an instruction to generate a user menu 22 on the user interface 14 specific to the categorization. For example, the menu 22 may be generated with a variety of options 58A-58C (e.g., with the menu generation module 116) that include controlling features locally within the vehicle 12 (e.g., speaker 60 controls, temperature regulation localized to the seating location 20A-20D). In addition, the variety of options 58A-58C may control features that are appropriated for the categorization of the at least one vehicle occupant 18A-18D based on a condition of the vehicle 12 (e.g., whether or not it is in motion), locality of the vehicle 12 (e.g., a regulation module 118 that includes local rules and regulations), and/or other safety parameters. The processor 104 may generate an instruction directly to the user interface 14 or the vehicular system controller 150.

The invention disclosed herein is further summarized in the following paragraphs and is further characterized by combinations of any and all of the various aspects described therein.

According to one aspect of the present disclosure, a monitoring system for a vehicle communicates with a user interface and includes a vision system that has a sensor configured to capture a presence of at least one vehicle occupant. A control system includes a processor configured to determine that the at least one vehicle occupant is attempting to interface with a user menu and determine a seating location of the first vehicle occupant attempting to interface with the user interface. The processor is further configured to categorize the first vehicle occupant attempting to interface with the user interface by the seating location and transmit an instruction to generate the user menu on the user interface specific to the categorization.

According to another aspect of the present disclosure, a categorization includes a passenger categorization and a driver categorization.

According to yet another aspect of the present disclosure, an instruction to generate a user menu specific to a driver categorization is different than the instruction to generate the user menu specific to a passenger categorization.

According to still another aspect of the present disclosure, a sensor is configured as an imaging device to capture a presence of at least one vehicle occupant in an image.

According to yet another aspect of the present disclosure, a processor is configured to determine that a first vehicle occupant is attempting to interface with a user interface by one of proximity of a first vehicle occupant reaching for a user interface or by the first vehicle occupant directly interfacing with the user interface.

According to another aspect of the present disclosure, a user menu specific to a categorization includes temperature regulation specific to a seating location.

According to yet another aspect of the present disclosure, temperature regulation includes activating at least one of a seat warmer or air circulation specific to a seating location.

According to still another aspect of the present disclosure, a user menu specific to a categorization includes an option to pair a mobile device that is only generated with a passenger categorization upon a determination by a processor that a vehicle is in motion.

According to another aspect of the present disclosure, a user menu specific to a categorization includes a GPS directions option that is only generated with a passenger categorization upon a determination by a processor that a vehicle is in motion.

According to yet another aspect of the present disclosure, a processor is configured to transmit an instruction to a vehicle control system that operates a user interface.

According to still another aspect of the present disclosure, a processor is further configured to determine that a second vehicle occupant is attempting to interface with a user interface simultaneously with a first vehicle occupant, determine a seating location of the second vehicle occupant, categorize the second vehicle occupant attempting to interface with the user interface by a seating location, and transmit an instruction to generate a user menu on the user interface with a first region of the user menu specific to a categorization of the first vehicle occupant and a second region specific to the categorization of the second vehicle occupant.

According to another aspect of the present disclosure, a monitoring system for a vehicle communicates with a user interface and includes a vision system that has at least one imaging device configured to capture a first image type of at least one vehicle occupant. A control system includes a processor that is configured to determine that the at least one vehicle occupant is attempting to interface with a user interface and determine a seating location of the vehicle occupant attempting to interface with the user interface with the first image type. The processor is further configured to categorize the vehicle occupant attempting to interface with the user interface by the seating location and transmit an instruction to generate a user menu on the user interface specific to a categorization.

According to another aspect of the present disclosure, a categorization includes a passenger categorization and a driver categorization. An instruction to generate a user menu specific to the driver categorization is different than the instruction to generate the user menu specific to the passenger categorization.

According to yet another aspect of the present disclosure, a user menu specific to a categorization includes temperature regulation specific to a seating location.

According to still another aspect of the present disclosure, a flood illumination source is configured to emit a flood illumination captured by at least one imaging device in a first image type.

According to another aspect of the present disclosure, a structured illumination source is configured to emit a structured light illumination captured by at least one imaging device in a structured image type.

According to still another aspect of the present disclosure, a processor is configured to extract a 2-dimensional ("2D") skeletal representation of a vehicle occupant attempting to interface with a user interface from a first image type, measure a depth of the 2D skeletal representation with a structured image type, extrapolate a 3-dimensional ("3D") skeletal representation of the vehicle occupant attempting to interface with the user interface, and categorize the vehicle occupant attempting to interface with the user interface by a seating location of the 3D skeletal representation.

According to yet another aspect of the present disclosure, a monitoring system for a vehicle communicates with a user interface and includes a vision system that has at least one imaging device configured to capture at least one image type of a vehicle occupant. A control system includes a processor that is configured to extrapolate a 3-dimensional ("3D") representation of the vehicle occupant from the at least one image type and categorize the vehicle occupant by a seating location of the 3D representation. The processor is further configured to identify that the vehicle occupant is reaching for the user interface and transmit an instruction to generate a user menu on the user interface specific to the categorization.

According to still another aspect of the present disclosure, at least one image type includes a first image type from a first orientation and a shifted image type from a second orientation. A 3D representation of a vehicle occupant is obtained by stereovision.

According to another aspect of the present disclosure, at least one image type includes depth information used in extrapolating the 3D representation with at least one of a time-of-flight process or a structured light process.

It will be understood by one having ordinary skill in the art that constructions of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A monitoring system for a vehicle comprising:
a vision system including a sensor configured to capture a presence of a first vehicle occupant and a second vehicle occupant; and
a processor configured to:
periodically receive rules and regulation data from an external database based, at least in part, on GPS coordinates of the vehicle;
determine that the first vehicle occupant and the second vehicle occupant are both attempting to interface with a user interface simultaneously;
determine a first seating location of the first vehicle occupant and a second seating location of the second vehicle occupant attempting to interface with the user interface by the captured presence;
categorize the first vehicle occupant and the second vehicle occupant attempting to interface with the user interface by the first seating location and the second seating location; and
transmit an instruction to generate a user menu on a display of the user interface with a first set of options on a first region of the display specific to the categorization of the first vehicle occupant and a second set of options on a second region of the display specific to the categorization of the second vehicle occupant location simultaneously with first set of options, wherein the first and second set of options are further based, at least in part, on the rules and regulation data, and wherein the first and second set of options include at least one of a temperature regulation or a speaker setting localized specific to the first seating location and the second seating location, respectively.

2. A monitoring system for a vehicle comprising:
a vision system including at least one imaging device configured to capture a first image type of a first vehicle occupant and a second vehicle occupant; and
a processor configured to:
determine that the first vehicle occupant and the second vehicle occupant are attempting to interface with a user interface;
determine a seating location of the first vehicle occupant and the second vehicle occupant attempting to interface with the user interface with the first image type;
categorize the first vehicle occupant and the second vehicle occupant attempting to interface with the user interface by the seating location; and
transmit an instruction to generate a user menu on a display of the user interface with a first set of options on a first region of the display specific to the categorization of the first vehicle occupant and a second set of options on a second region of the display specific to the categorization of the second vehicle occupant simultaneously with first set of options.

3. The monitoring system of claim 2, wherein the categorization includes a passenger categorization and a driver categorization and the instruction to generate the user menu specific to the driver categorization is different than the instruction to generate the user menu specific to the passenger categorization.

4. The monitoring system of claim 3, wherein the at least one imaging device is further configured to capture a structured image type of the first vehicle occupant and the second vehicle occupant, and the processor is further configured to:
extract a 2-dimensional ("2D") skeletal representation of the first vehicle occupant and the second vehicle occupant attempting to interface with the user interface from the first image type;
measure a depth of the 2D skeletal representations with the structured image type;
extrapolate a 3-dimensional ("3D") skeletal representation of the first vehicle occupant and the second vehicle occupant attempting to interface with the user interface; and
categorize the first vehicle occupant and the second vehicle occupant attempting to interface with the user interface by the seating location of the 3D skeletal representations.

5. The monitoring system of claim 2, wherein the user menu specific to the categorization includes temperature regulation specific to the seating location.

6. The monitoring system of claim 2, wherein a flood illumination source is configured to emit a flood illumination captured by the at least one imaging device in the first image type.

7. The monitoring system of claim 2, wherein a structured illumination source is configured to emit a structured light illumination captured by the at least one imaging device in a structured image type.

8. A monitoring system for a vehicle comprising:
a vision system including a structured light illumination source configured to project a structured light illumination distributed in a light spot array and substantially in the infrared spectrum, the vision system further including at least one imaging device configured to capture at least one image type of a plurality of light spots of the light spot array reflected from a vehicle occupant; and
a processor configured to:
extrapolate a depth of the vehicle occupant;
extrapolate a 3-dimensional ("3D") representation of the vehicle occupant from the at least one image type;
categorize the vehicle occupant by a seating location of the 3D representation as a driver or a passenger;
determine that the vehicle occupant is categorized as the passenger, determine a size of the 3D representation in absolute scale to sub-categorize the passenger as an adult or a child; and
transmit an instruction to generate a user menu on the user interface specific to the sub-categorization.

9. The monitoring system of claim 8, wherein the structured light illumination source includes a plurality of laser diodes and an optical lens.

10. The monitoring system of claim 9, wherein the optical lens includes a collimation element and a diffractive element.

* * * * *